Patented July 14, 1953

2,645,629

UNITED STATES PATENT OFFICE 2,645,629

ACCELERATED CONDENSING ORGANOPOLYSILOXANE COMPOSITIONS

Siegfried Nitzsche, Burghausen, Upper Bavaria, Germany, assignor to Dr. Alexander Wacker Gesellschaft für Elektrochemische Industrie G. m. b. H., Munich, Bavaria, Germany No Drawing. Application December 19, 1951, Serial No. 262,493. In Germany December 30, 1950

10 Claims. (Cl. 260—46.5)

The present invention relates to an improved method for accelerating the condensation of an organopolysiloxane resin. It is particularly concerned with the use of an aluminum chelate as a condensation catalyst for Si-H containing organopolysiloxanes.

Various metal salts have been described as catalysts for the curing of conventional organosiloxane resins. Even these catalyzed resins, however, have had too long a curing time at too high a temperature to be practical for use on many materials which are damaged by heat.

It is an object of the present invention to provide an improved method for accelerating the curing time of certain organopolysiloxanes and to provide improved heat hardenable organosiloxane compositions. It is a further object to provide improved catalyzed organosiloxane resin forming compositions suitable for application to cellulosic materials such as paper and to organic fabrics, said compositions being heat hardenable at temperatures low enough to avoid damage to the material being treated.

In accordance with the method of the present invention, an aluminum chelate is added to a Si-H containing organopolysiloxane having an average degree of substitution of from 1 to 2 inclusive organic groups per silicon atom. This produces a heat hardenable composition which is readily cured at very low temperatures.

The aluminum chelate is ordinarily employed in amounts of from 0.01 to 20 per cent by weight, based on the weight of the polysiloxane. Preferably the amount employed ranges from about 0.01 to 1.0 per cent by weight. Amounts as low as 0.001 per cent by weight may be used if desired, but such smaller amounts may require longer periods of heating or the use of higher temperatures in order to bring about the required degree of curing of the siloxane resin. The chelate employed is preferably soluble in the organopolysiloxane, or in an organic solvent in which the siloxane can be dissolved. The preferred aluminum chelates are the chelates of aluminum with acetyl acetone, acetoacetic acid and its esters, particularly the ethyl esters, or with malonic acid esters.

The organopolysiloxane employed has an average degree of substitution of from 1 to 2 organic radicals per silicon atom. These radicals may be any of the organic groups capable of being attached to a silicon atom. Thus the radicals may be alkyl, aryl, alkaryl, aralkyl, alkalene, or substituted radicals such as haloalkyl and haloaryl radicals. Examples of such radicals are methyl, ethyl, propyl, octadecyl, phenyl, benzyl, tolyl, naphthyl, chlorophenyl and the like. Either the same or different radicals may be attached to each silicon atom, or to different silicon atoms in each molecule.

At least some of the silicon atoms in the organopolysiloxane have hydrogen atoms bonded thereto, thus there is at least one Si-H unit in each siloxane molecule. Preferably at least 10 per cent of the silicone atoms present are bonded to hydrogen. The siloxane may also contain minor amounts of alkoxy and hydroxy radicals. Preferably such alkoxy radicals, if present at all, are present in an amount less than 10 per cent by weight.

Thus the preferred organopolysiloxanes are polymers or copolymers having the average general formula

$$R_a H_b SiO_{\frac{4-a-b}{2}}$$

where R is an organic radical, $a$ has an average value of from 1 to 2 inclusive and $b$ has an average value of from 0.1 to 1.25. Preferably, R is a monovalent hydrocarbon radical or a halogen-substituted hydrocarbon radical. Alkyl and/or monocyclic aryl radicals are most preferred.

These organopolysiloxanes are well known materials. They may be prepared by the hydrolysis of an organohydrogenhalosilane or mixtures of such silanes, or by cohydrolysis of such silanes with organohalosilanes containing no hydrogen bonded to silicon. The corresponding alkoxy derivatives may be employed to give siloxane products containing alkoxy groups. Alternatively, the halosilanes may be hydrolyzed in the presence of an alcohol to incorporate some of the corresponding alkoxy groups into the siloxane molecule.

Thus, for example, the siloxanes may be prepared by the hydrolysis of silanes such as

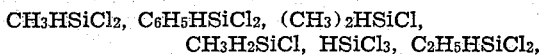

$CH_3HSiCl_2$, $C_6H_5HSiCl_2$, $(CH_3)_2HSiCl$, $CH_3H_2SiCl$, $HSiCl_3$, $C_2H_5HSiCl_2$, and $C_3H_7HSiCl_2$ or their alkoxy derivatives, or from mixtures of such silanes, or by the cohydrolysis of such silanes with

$CH_3SiCl_3$, $(CH_3)_2SiCl_2$, $(CH_3)_3SiCl$, $C_2H_5SiCl_3$, $C_6H_5SiCl_3$, $C_6H_5CH_3SiCl_2$, $CH_3(C_{18}H_{37})SiCl_2$, and the corresponding alkoxy derivatives. When alkoxy derivatives are employed, the preferred compounds are the lower alkoxy derivatives such as, for example, the methoxy, ethoxy, propoxy, and isopropoxy derivatives of the above halosilanes.

The preferred organopolysiloxanes are those in which substantially all of the organic groups are methyl and/or phenyl groups.

Compositions in accordance herewith may be employed as solutions in organic solvents, in aqueous emulsions, or in an undiluted form. They are useful as lacquers, varnishes, and protective and insulating coatings in general. They can be applied to fabrics to render the fabrics water repellent. Conventional fillers and pigments or other resinous materials may be added to the composition if desired.

The low temperature curing qualities of the present compositions make them eminently suitable for application to cellulosic materials such as paper and to organic fabrics, both of which materials are easily damaged by heat.

The temperature necessary to cure the present compositions to a tack-free state is of course a function of the curing time. A cured resin can be obtained at room temperature, but the time required makes such a cure impractical on a commercial basis. It has been found that temperatures of 100° C. or less are sufficient to completely condense and cure the present compositions in 5 to 10 minutes or less.

The following examples are illustrative only. Parts given are parts by volume unless otherwise stated.

Example 1

A mixture was prepared of 50 parts $CH_3HSiCl_2$, 40 parts $(CH_3)_2SiCl_2$, and 80 parts of $CCl_4$. To this mixture was added 10 parts of ethanol. When the resulting evolution of HCl had ceased, the product was cooled and slowly added to an excess of water. The siloxane obtained was separated from the excess water, washed free of acid, and diluted with methylene chloride. The polysiloxane in this solution contained a hydrogen atom bonded to about 59 per cent of the silicon atoms present, and also contained a minor amount of unreacted ethoxy radicals. Aluminum acetylacetonate was added to a portion of the solution in an amount of 0.05 per cent by weight based on the weight of the polysiloxane. This catalyzed solution was applied to paper and to various organic textile fabrics such as wool, cotton and nylon, and an aqueous emulsion of the solution was applied to rayon. The siloxane was cured by heating these materials for 5 minutes at 80° C. The treated materials were highly water repellent. As a comparison, the uncatalyzed material required 10 to 15 minutes at 180° C. to become cured. During this time some of the materials being treated were partially destroyed by the heat.

Example 2

Results comparable to those obtained in Example 1 are obtained when the procedure is repeated using aluminum ethyl acetoacetate or ethyl malonate in place of the aluminum acetylacetonate.

Example 3

A mixture of $C_2H_5HSiCl_2$, $CH_3SiCl_3$, and $CH_3(C_{18}H_{37})SiCl_2$ was hydrolyzed by adding it to an excess of water. Addition of 0.01 per cent by weight of aluminum acetylacetonate or aluminum ethyl acetoacetate to the acid-free hydrolyzate decreases the curing time and curing temperature to a very great extent.

Example 4

A mixture of $CH_3HSiCl_2$, $CH_3SiCl_3$, and $C_6H_5CH_3SiCl_2$ in the molar ratio of 10:45:45 was hydrolyzed and washed free of acid. The addition of from 0.005 to 0.05 per cent by weight of the chelates of Examples 1 and 2 to the hydrolyzate produces a marked reduction in the curing time and curing temperature necessary to obtain a tack-free product.

Example 5

A 40 per cent toluene solution of a copolymeric polysiloxane containing Si-H groups which was obtained in the usual manner by hydrolyzing equimolar amounts of $(CH_3)_2SiCl_2$ and $CH_3SiHCl_2$ was mixed with 0.1 per cent (with regard to the weight of the polysiloxane) of aluminum acetylacetonate. This solution was used for wetting various textiles and paper which were then heated for five minutes to a temperature of 80° to 100° C. After this time, the curing is finished. The impregnation of the textiles or paper is very resistant to washing and dry cleaning. If the same material is treated with a solution of the polysiloxane without the addition of the aluminum compound, it is necessary, in order to obtain the same effect, to heat the material for at least 10 minutes to 180° to 190° C. The material thus obtained is damaged to a considerable extent.

Example 6

By using 50 parts of the polysiloxane copolymerizate of Example 5 an emulsion is prepared with 45 parts of water and 5 parts of monoamine AA–100. 0.4 per cent (with regard to the weight of the siloxane) of aluminum acetylacetonate are added. Textiles and paper are sprayed with this emulsion and, after evaporation of the water, heated for 7½ minutes to 80° C. The treatment thus obtained is very resistant to repeated washing and dry cleaning, whereas the same materials, treated with the same emulsion but without addition of the aluminum compound, must be heated up to 190° C. for the same period in order to obtain the same result and are thereby considerably damaged.

Example 7

A polysiloxane containing Si-H groups and also methyl and ethyl radicals is prepared by hydrolyzing equimolar amounts of $(CH_3)_2SiCl_2$ and $C_2H_5SiHCl_2$ with water. By dissolving the polymerizate in methylene chloride a 15 per cent solution is prepared to which aluminum ethyl acetoacetate is added in amount equal to 0.6 per cent (with regard to the siloxane weight). Pieces of cotton fabric are wetted with this solution and are heated, after the evaporation of the solvent, for 10 minutes at 100° C. The treatment thus obtained resists repeated washings and dry cleanings. Test pieces impregnated with the same siloxane solution but without addition of the curing agent require heating for 10 minutes up to 170° C. in order to obtain the same degree of cure and stability.

Example 8

By hydrolyzing a mixture of 2 mols of $CH_3SiHCl_2$ 2 mols of $CH_3C_6H_5SiCl_2$ and 1 mol of $CH_3SiCl_3$ in the presence of a minor amount of ethyl alcohol with water, there is obtained a resinous copolymerizate containing Si-H groups and methyl and phenyl radicals besides a small amount of alkoxy radicals.

By dissolving the copolymerizate in toluene a 30 per cent solution is prepared. To this solution 0.5 per cent (with regard to the siloxane weight) of the complex compound of aluminum with ethylmalonic acid ester are added. Cotton textiles treated with this solution are heated for 7 minutes to 90° C. The textiles are thus rendered water-repellent and retain this quality even after repeated washings and dry cleanings.

That which is claimed is:

1. The process for accelerating the condensation of an organopolysiloxane having an average degree of substitution of from 1 to 2 inclusive organic radicals per silicon atom, said organic radicals being attached to the silicon atoms by direct carbon to silicon linkage and at least some of the silicon atoms in said siloxane having at least one hydrogen atom bonded thereto, which comprises adding an aluminum chelate selected from the group consisting of chelates of aluminum with acetyl acetone, acetoacetic acid, esters of acetoacetic acid, and esters of malonic acid, to said siloxane in an amount sufficient to accelerate the condensation of said siloxane.

2. The process of claim 1 in which the organopolysiloxane has the average general formula $$R_a H_b SiO_{\frac{4-a-b}{2}}$$

where R represents a radical selected from the group consisting of alkyl and monocyclic aryl radicals, $a$ has an average value of from 1 to 2 inclusive, and $b$ has an average value of from 0.1 to 1.25 inclusive.

3. The process of claim 1 in which the aluminum chelate is present in an amount of from .01 to 1.0 per cent by weight based on the weight of the organopolysiloxane.

4. The process of claim 2 in which the chelate is aluminum ethyl acetoacetate.

5. The process of claim 2 in which the chelate is aluminum ethyl malonate.

6. A composition of matter comprising an organopolysiloxane having an average degree of substitution of from 1 to 2 inclusive organic radicals per silicon atom, said organic radicals being attached to the silicon atoms by direct carbon to silicon linkage and at least some of the silicon atoms in said siloxane having at least 1 hydrogen atom bonded thereto, and a chelate selected from the group consisting of chelates of aluminum with acetyl acetone, acetoacetic acid, esters of acetoacetic acid, and esters of malonic acid, said chelate being present in an amount sufficient to accelerate the condensation of the organopolysiloxane.

7. The composition of claim 6 in which the organopolysiloxane has the average general formula $$R_a H_b SiO_{\frac{4-a-b}{2}}$$

where R represents a radical selected from the group consisting of alkyl and monocyclic aryl radicals, $a$ has an average value of from 1 to 2 inclusive, and $b$ has an average value of from 0.1 to 1.25 inclusive.

8. The composition of claim 7 in which the chelate is aluminum ethyl acetoacetate.

9. The composition of claim 6 in which the chelate is aluminum ethyl malonate.

10. The composition of claim 7 in which the aluminum chelate is present in an amount of from .01 to 1.0 per cent by weight based on the weight of the organopolysiloxane.

SIEGFRIED NITZSCHE.

References Cited in the file of this patent

UNITED STATES PATENTS

| Number | Name | Date |
|---|---|---|
| 2,465,296 | Switzerland | Mar. 22, 1949 |